United States Patent [19]

Marui et al.

[11] Patent Number: 4,996,715
[45] Date of Patent: Feb. 26, 1991

[54] RADIO TELEPHONE APPARATUS

[75] Inventors: Kuniyoshi Marui, Saitama; Kiyoshi Hattori, Tokyo, both of Japan

[73] Assignee: Kabushiki Kaisha Toshiba, Japan

[21] Appl. No.: 248,921

[22] Filed: Sep. 21, 1988

[30] Foreign Application Priority Data

Sep. 29, 1987 [JP] Japan .................. 62-244621

[51] Int. Cl.⁵ .............................. H04Q 7/04
[52] U.S. Cl. ....................... 455/33; 455/54; 379/60; 379/63
[58] Field of Search ............ 455/33, 54, 67, 229, 455/68, 69; 379/60, 70, 71, 61, 58, 59, 63; 340/511

[56] References Cited

U.S. PATENT DOCUMENTS

| | | | |
|---|---|---|---|
| 4,032,723 | 6/1977 | Mendoza | 379/61 |
| 4,475,010 | 10/1984 | Huensch et al. | 379/60 |
| 4,593,273 | 6/1986 | Narcisse | 340/539 |
| 4,761,806 | 8/1988 | Toki | 379/61 |
| 4,775,995 | 10/1988 | Chapman et al. | 379/58 |
| 4,802,201 | 1/1989 | Yoshizawa et al. | 379/62 |

*Primary Examiner*—Douglas W. Olms
*Assistant Examiner*—Min Jung
*Attorney, Agent, or Firm*—Banner, Birch, McKie & Beckett

[57] ABSTRACT

Radio telephone apparatus for use in a cellular mobile telephone system comprises means for alarming at least a user operating the apparatus in response to a drop in signal strength of radio frequency signals received over an established communication channel when the apparatus approaches a boundary of service area in a cellular mobile telephone system. The signal strength is repetitively checked to determine if it has fallen below a first predetermined signal strength value. When the signal strength falls to or below a second predetermined signal strength value, the radio telephone apparatus causes a disconnection of the telephone link and returns the apparatus to a standby mode.

24 Claims, 3 Drawing Sheets

RADIO TELEPHONE APPARATUS

BACKGROUND OF THE INVENTION

1. Field of the Invention

This invention relates to the field of radio telephone apparatus and more particularly to a mobile telephone unit of a mobile telephone system.

2. Description of the Relevant Art

In cellular mobile telephone systems, a large geographical area is covered and served by breaking the area into a plurality of small zones or cells. Within the combined plurality of small zones, i.e., a service area, a mobile telephone is capable of establishing a communication link with another party. Outside the service area, however, the mobile telephone may not be served by the serving system. Accordingly, when a vehicle equipped with the mobile telephone leaves the service area and a communication link i.e., a speech line with another party has already been established, the communication link may suddenly be disconnected. This sudden break down of an established speech line displeases users.

SUMMARY OF THE INVENTION

It is accordingly an object of the present invention to provide a radio telephone apparatus in which a user may know in advance that their vehicle in which their cellular telephone apparatus is installed is approaching a boundary of the service area.

To achieve the object and in accordance with the purpose of the present invention, as embodied and described herein, the invention comprises means for receiving signals transmitted over a radio channel; means coupled to the receiving means for measuring the strength of the received signals; signal generating means coupled to the measuring means, and, in the event that a communication link using the channel has already been stabilized, the signal generating means generating a first signal in response to the detection of a signal strength measured by the measuring means below a first predetermined value and generating a second signal in response to a decrease in signal strength to or below a second predetermined value; means responsive to the first signal for alarming at least one user of the apparatus; and means responsive to the second signal for causing a disconnection of the communication link.

DETAILED DESCRIPTION OF THE PREFERRED EMBODIMENT

An embodiment of the present invention will now be described with reference to the accompanying drawings.

Figure 1:
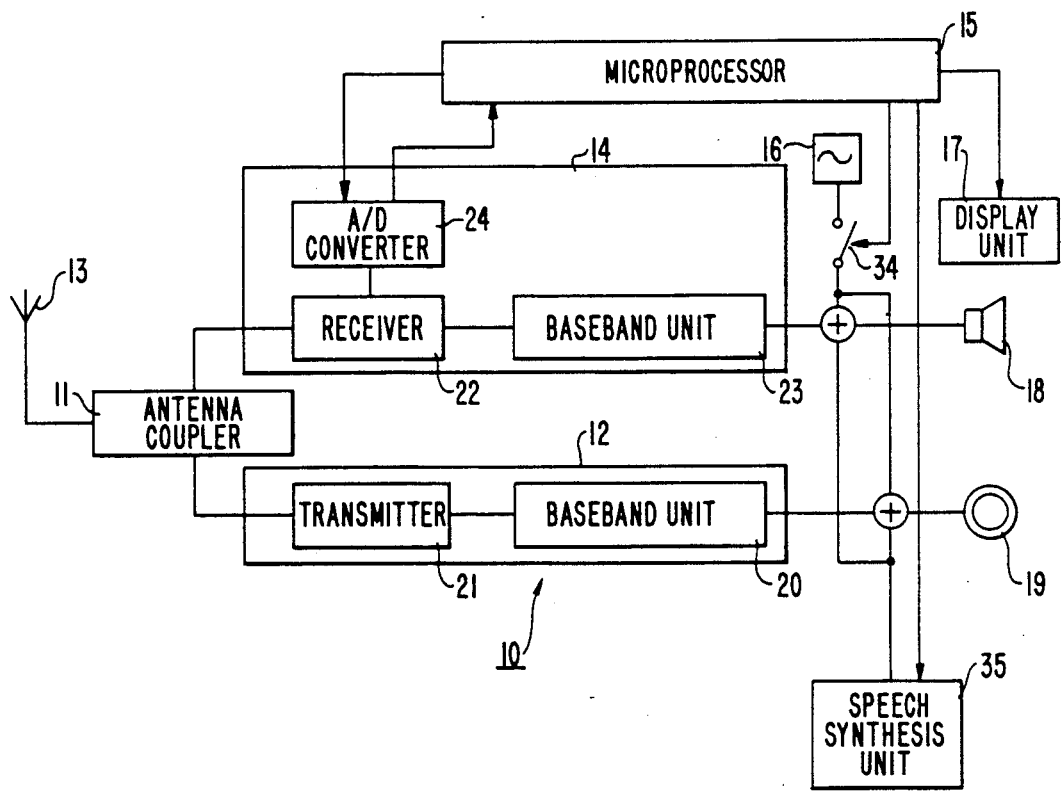
FIG. 1 is a schematical block diagram showing an arrangement of radio telephone apparatus associated with an embodiment of the present invention.

FIG. 1 is a block diagram showing an arrangement of a mobile unit associated with one embodiment of the invention.

Referring to FIG. 1, mobile unit 10 comprises antenna coupler 11 for transferring signals from transmitter section 12 to antenna 13 and for transferring signals from antenna 13 to receiver section 14, microprocessor 15 for controlling elements of mobile unit 10, oscillator 16 for generating tones, displaying unit 17 for displaying information sent from microprocessor 15, speaker 18 for outputting signals from receiver section 14 or from tone generated 16, microphone 19 for inputting signals to transmitter section 12, switch 34 controlled by microprocessor 15, and speech synthesis unit 35 for synthesizing predetermined speech patterns.

Transmitter section 12 includes baseband unit 20 coupled to an input speech signal for processing signals at baseband frequency and transmitter 21 coupled to the output of baseband unit 20 for modulating the output signal to be broadcast via antenna coupler 11 and antenna 13. Receiver section 14 includes receiver 22 coupled to antenna coupler 11 for demodulating received signals, baseband unit 23 coupled to the output of receiver 22 for processing the received signals, and A/D converter 24 for converting an analog signal supplied thereto to a digital signal responsive to control of microprocessor 15.

Figure 2:
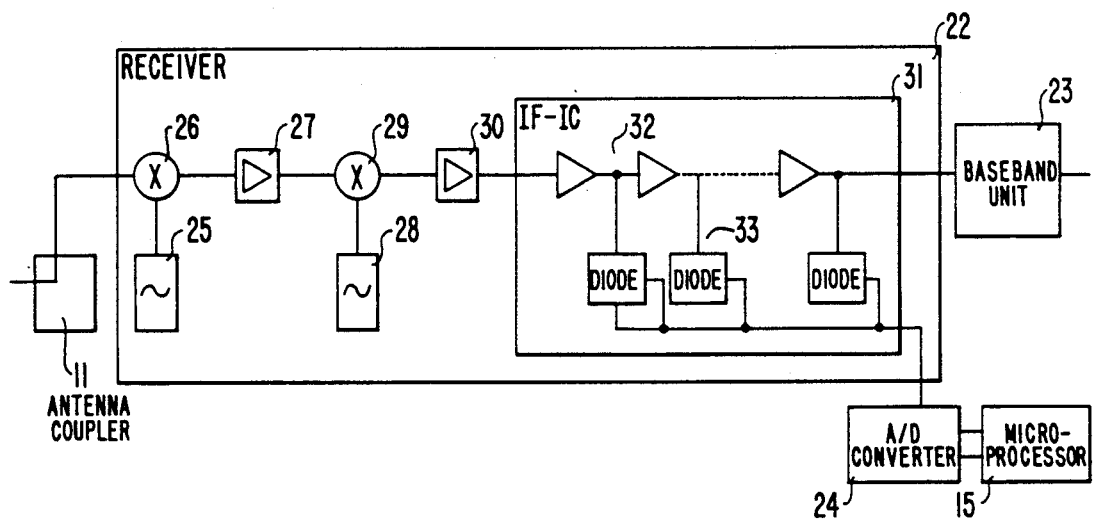
FIG. 2 is a schematical block diagram mainly showing the detail of the receiver in FIG. 1.

More specifically, as shown in FIG. 2, receiver 22 includes first signal source 25, mixer 26 for combining an incoming radio-frequency signal with the signal from first signal source 25, first I-F (intermediate-frequency) amplifier 27 for amplifying the output signal of mixer 26, second signal source 28, mixer 29 for combining the output signal of first I-F amplifier 27 with signal from second signal source 28, second I-F amplifier 30 for amplifying the output signal of mixer 29, and I-F integrated circuit (IC) 31. I-F IC 31 may comprise a plurality of linear amplifiers 32 for amplifying received signals and a plurality of diodes 33 for detecting the strength of received signals.

Figure 3:
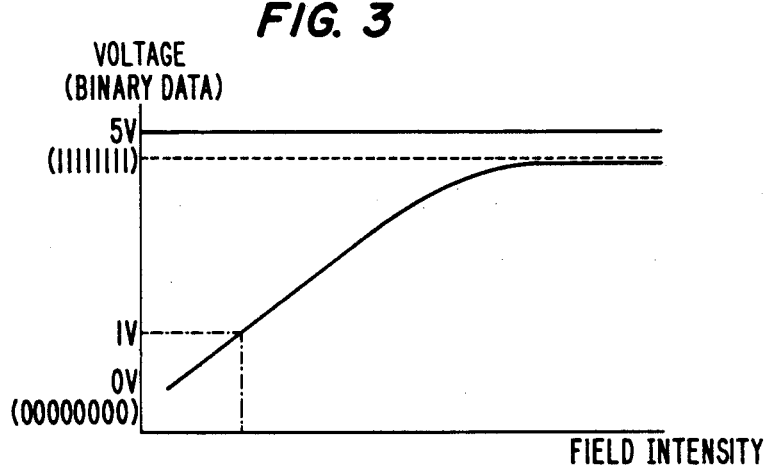
FIG. 3 is a graph of signal field strength versus voltage showing the relationship between the voltage value detected by detectors and field intensity indicative of the strength of received signals.

FIG. 3 shows the relationship between the voltage value detected by the plurality of didoes 33 and field intensity indicative of received radio frequency signal strength. The detected voltage value, for example 0-5 volts is converted to a digital value having a range, for example of 00000000-11111111 by A/D converter 24. This digital value is applied to microprocessor 15. When the detected voltage value decreases to a first predetermined value, for example, 1 volt, microprocessor 15 controls switch 34 so that the tone output of oscillator 16 is applied to speaker 18 and transmitter section 12, thereby an alarm sound generated via speaker 18 is likewise transmitted to the radio channel via transmitted section 12. When the detected voltage value decreases to a second lower predetermined value, for example, 0 volts microprocessor 15 controls transistor section 12 so as to terminate broadcasting and receiver section 14 so as to receive signals of a telephone signal link control channel. A voice synthesized alarm may also be provided by voice synthesis unit 35 as described below.

Figure 4:
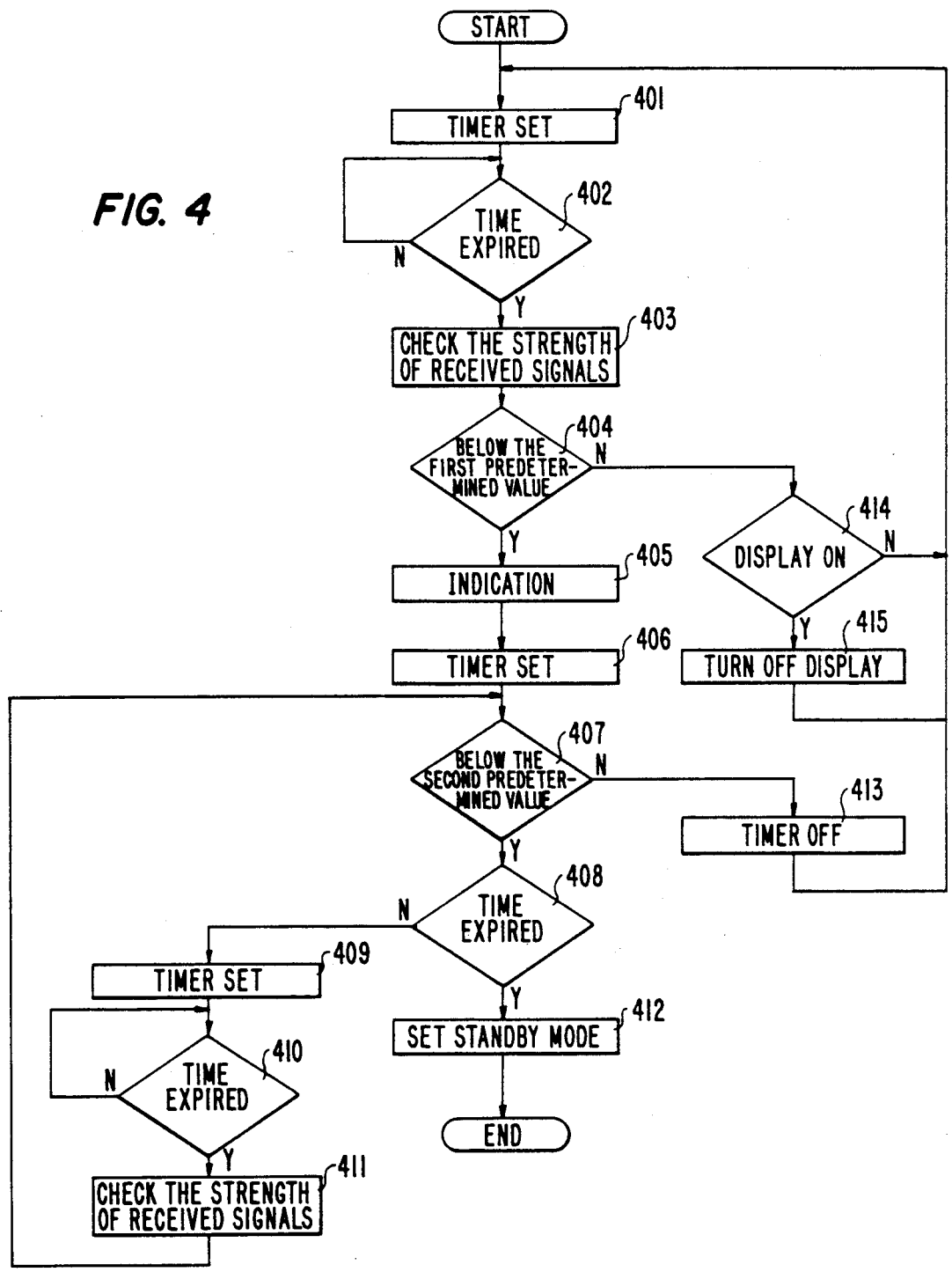
FIG. 4 is a flow chart of an algorithm showing the indication operation of the embodiment.

Now the operations of mobile unit 10 in accordance with the embodiment will be described in reference to FIGS. 4 and 3.

In this embodiment, the strength of received radio frequency signals is checked after a predetermined time interval (steps 401, 402, and 403), for example, every five seconds. The time interval is counted down by a timer of microprocessor 15 or, alteratively, a peripheral unit thereto. After the time delay expires at step 402, the microprocessor continues to step 403.

Figure 5:
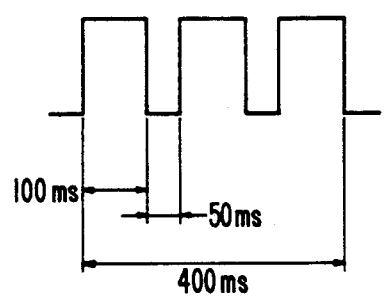
FIG. 5 is a time chart for explaining the provision of an alarm by the embodiment.

If the digital value corresponding to the detected signal voltage at step 403 is equal to or lower than the digital value corresponding to the first predetermined voltage value (step 404), for example 1 volt, microprocessor 15 activates switch 34 so that the output of oscillator 16 is applied to speaker 18 and to transmitter section 12, thereby an alarm tone generated by oscillator 16 is sounded via speaker 18 and also transmitted to the radio channel via transmitter section 12. Therefore this alarm may also be heard by the other party to the conversation. If the overall duration of the alarmer is 400 ms, for example, comprising a repeating nonsilence duration of 100 ms and a silence duration of 50 ms as shown in FIG. 5, users may easily perceive the alarm sound as distinct from other telephone signals and the alarm may not significantly interfere with the telephone conversation. Furthermore microprocessor 15 may control display unit 17 so that an alarm message, for example, "NEAR BOUNDARY" OR "speech line DISCONNECT SOON" is displayed. Microprocessor 15 may simultaneously control speech synthesis unit 35 so that an alarm message is sounded via speaker 18 and, on the other hand, transmitted to the radio channel via transmitted section 12 typically after the audible periodic tone (FIG. 5) is sounded. In this case, speech synthesis unit 35 may artificially synthesize speech on the basis of prestored data or reproduce spoken words of the user which have been stored in advance (step 405). On the other hand, in the event that the digital value corresponding to the detected voltage returns to a level above the digital value corresponding to the first predetermined value (step 404) in the next iteration (the predetermined time interval has lapsed) or measurement at step 411, microprocessor 15 terminates displaying the alarm message if appropriate and the operation of microprocessor 15 returns to step 401 (via steps 414 and 415).

Next microprocessor 15 checks whether the detected voltage value determined at step 403 is below a second predetermined value or has fallen to 0 voltage (step 407) after setting a timer to a second predetermined interval of, for example, 5 seconds (step 406). If the detected signal voltage is not below or has not fallen to the second predetermined value, the operation of microprocessor 15 returns to step 401 to check the signal strength again to determine if it is below the first predetermined level. First, however, the timer turned on at step 406 is turned at step 413.

If the detected voltage value determined at step 403 is at or below the second predetermined voltage value (step 407), it would be normally expected that the five second interval established at step 406 has not yet expired at step 408. Then the timer is set to a third predetermined interval of, for example, 5 seconds at step 409. Once the time expires at step 410, the signal level is checked against at step 411. At box 407, it is again determined that the signal value, for example, is 0 volts and the signal level has remained at or below the second predetermined level. Now time has expired at step 408 and the mobile telephone receiver returns to a standby mode at step 412. This entails causing a disconnection from the telephone link at a telephone central office including terminating a broadcasting from transmitter section 12. Also, receiver section 14 returns to a control channel for receiving telephone link controls signals. It may be seen that two sequential measurements of signal level at, for example, 0 volts are required before the link is caused to be disconnected.

From the above description, the first predetermined value for signal strength may be assumed to equal the second predetermined value in one embodiment or may be greater than the second predetermined value in a second embodiment. If at step 403 (FIG. 4) the signal strength value decreases below either the first or second predetermined value (the values being equal in the first embodiment, an alarm tone generated by oscillator 16 may be immediately sounded via speaker 18 and also transmitted to the radio channel via transmitter section 12 (and other appropriate indications made, for example, via display 17). Furthermore, microprocessor 15 sets the timer to a second predetermined interval at step 406 of, for example, 5 seconds. Consequently, unless the signal strength value recovers within the second predetermined interval, the communication link will be disconnected at step 412. During the second predetermined interval of time, the several indications of an alarm initiated at step 405 continue to be indicated to at least one party to the conversation.

In accordance with the second embodiment and in the event that the second predetermined value is not the same value but may be less than the first predetermined value for signal strength, two types of alarm indications may be initiated. A first alarm message of form in accordance with the above i.e. NEAR BOUNDARY may be ordered at step 405. However, in the second embodiment a second indication step may be provided between steps 409 and 410 such that in the first passage through loop 407–411 a more urgent indication is provided for the third predetermined interval. For example, if the signal strength value decreases below the second predetermined value, urgent types of indicia such as a more rapid periodic alarm tone or a more important displayed message such as "SPEECH LINE DISCONNECT IMMINENT" may be provided until the third predetermined interval lapses.

The first, second and third predetermined intervals at steps 401, 406 and 409 and preferably as short as 4–5 seconds to insure that in-use channels are freed for use by others after a reasonable period of time.

We claim:

1. A cellular radiotelephone unit for use in a cellular radiotelephone system for serving one or more geographic areas formed of a plurality of cellular zones, the cellular radiotelephone unit comprising:

receiving means for receiving radio signals transmitted over a speech radio channel or a control radio channel;

measuring means, coupled to the receiving means, for measuring the strength of the radio signals received by the receiving means;

alarming means for alarming at least the user of the cellular mobile radiotelephone unit in response to the detection of a signal strength value measured by the measuring means at or below a first predetermined value after a communication link with a second party using the speech radio channel is established; and control means for controlling the receiving means to receive radio signals transmitted over the control radio channel, in stead of the speech radio channel, in response to the detection of a signal strength value measured by the measuring means at or below a second predetermined value, the second predetermined value being no greater than the first predetermined value.

2. The cellular radiotelephone unit of claim 1 wherein the alarming means comprises means for generating sounds and a related sound signal.

3. The cellular radiotelephone unit of claim 2 further comprising means for broadcasting the generated sound signal over the communication link with the second party.

4. The cellar radiotelephone unit of claim 2 wherein the sound generating means comprises speech synthesis means for synthesizing predetermined speech patterns.

5. The cellular radiotelephone unit of claim 2 wherein the generated sounds and related sound signal comprise a periodic signal of less than one second duration in which short periods of tone are interleaved with shorter periods of silence.

6. The cellular radiotelephone unit of claim 4 wherein the predetermined speech patterns simulate the voice of the user of the unit.

7. The cellular radiotelephone unit of claim 1 wherein the alarming means comprises a visual display unit.

8. The cellular radiotelephone unit of claim 1 wherein the first predetermined value of signal strength is equal to the second predetermined value of signal strength and the control means controls the receiving means to receive over the control radio channel when the signal strength value is at or below the first or second predetermined value and after the alarming means alarms the user of the apparatus.

9. The cellular radiotelephone unit of claim 1 wherein the first predetermined value of signal strength is greater than the second predetermined value of signal strength.

10. A cellular radiotelephone unit for use in a cellular radiotelephone system for serving one or more geographic areas formed of a plurality of cellular zones, the cellular radiotelephone unit comprising:

receiving means for receiving radio signals transmitted over a reverse radio channel;

broadcasting means for broadcasting radio signals to be transmitted over a forward radio channel;

measuring means, coupled to the receiving means, for measuring the strength of the said signals received by the receiving means;

alarming means for alarming at least the user of the cellular radiotelephone unit in response to a detection of a signal strength value measured by the measuring means at or below a first predetermined value after a communication link with a second party using the forward and reverse radio channels is established; and control means for controlling the broadcasting means to terminate broadcasting radio signals over the forward radio channel in response to a detection of a signal strength value measured by the measuring means at or below a second predetermined value, not greater than the first predetermined value, the receiving means continuing to receive radio signals transmitted over the reverse radio channel after termination of signal broadcast over the forward radio channel.

11. The cellular radiotelephone unit of claim 10 wherein the alarming means comprises means for generating sounds and a related sound signal.

12. The cellular radiotelephone unit of claim 11 further comprising means for broadcasting the generated sound signal over the communication link with the second party.

13. The cellular radiotelephone unit of claim 11 wherein the sound generating means comprises speech synthesis means for synthesizing predetermined speech patterns.

14. The cellular radiotelephone unit of claim 10 wherein the alarming means comprises a visual display unit.

15. The cellular radiotelephone unit of claim 10 wherein the first predetermined value of signal strength measured by the measuring means is equal to the second predetermined value of signal strength and the control means controls the broadcasting means to terminate radio signal broadcast after the signal strength value is at or below the first or second predetermined value and after the alarming means alarms the user of the unit.

16. The cellular radiotelephone unit of claim 10 wherein the first predetermined value of signal strength is greater than the second predetermined value of signal strength.

17. A cellular radiotelephone unit of use in a cellular radiotelephone system serving one or more geographic areas formed of a plurality of cellular zones, the cellular radiotelephone unit comprising:

receiving means for receiving radio signals transmitted over a reverse radio channel;

broadcasting means for broadcasting signals to be transmitted over a forward radio channel;

measuring means, coupled to the receiving means, for measuring the strength of the signals received by the receiving means;

sound generating means for generating sounds and a related sound signal;

means for providing the sound signal generated by the sound generating means to the broadcasting means so that the sounds are transmitted to a second party connected to the user of the unit over a communication link using the forward and reverse radio channels in response to the detection of a signal strength value measured by the measuring means at or below a first predetermined value after the communication link is established; and controlling means for controlling the broadcasting means to terminate broadcasting radio signals over the forward radio channel in response to the detection of a signal strength value measured by the measuring means at or below a second predetermined value which is not greater than the first predetermined value after transmitting the sounds to the second party.

18. The cellular radiotelephone unit of claim 17 wherein the sound generating means comprises speech synthesis means for synthesizing predetermined speech patterns.

19. The cellular radiotelephone unit of claim 17 further comprising display means for providing a visual display indicating the return to a signal strength value above the first predetermined value after the signal strength value measured by the measuring means is at or below the first predetermined value.

20. The cellular radiotelephone unit of claim 17 wherein the first predetermined value of signal strength is greater than the second predetermined value of signal strength.

21. A method for alarming a user and a second party connected together over a radio communication link, the method for use in a cellular radiotelephone unit, the method comprising the steps of:

receiving radio signals transmitted over a control radio and a speech radio channel;

broadcasting radio signals to be transmitted over the speech radio channel;

measuring the strength of the received radio signals;

providing sounds and a related sound signal, the related sound signal being transmitted to the second party in response to the detection of a signal strength value below a first predetermined value after the communication link using the speech radio channel is established;

controlling the broadcasting means to terminate broadcasting the radio signals and the receiving means to receive signals transmitted over the control radio channel in stead of the speech radio channel in response to the detection of a signal strength value at or below a second predetermined value after transmitting the related sound signals to the second party.

22. The method of claim 21 further comprising the step of visually displaying an indication when the received signal strength returns to a level above the first predetermined value.

23. The method of claim 21 wherein the sounds and related sound signals comprise synthesized speech.

24. The method of claim 21 wherein the first predetermined value of signal strength is greater than the second predetermined value of signal strength.

* * * * *